Sept. 19, 1933.                A. R. WEJNARTH                1,927,763
      PROCESS FOR THE ELECTROTHERMAL TREATMENT OF MATERIALS
              CONTAINING VOLATILE METALS OR METAL OXIDES
                          Filed June 1, 1932
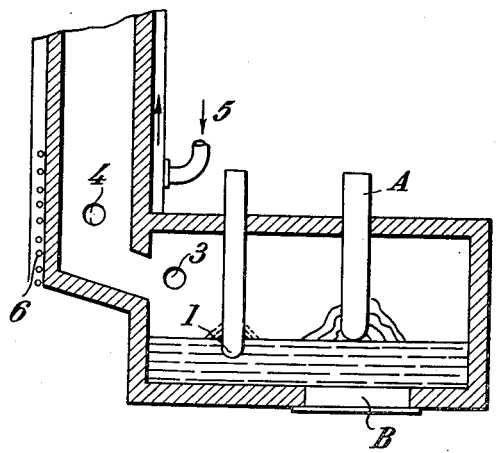
Inventor
Axel Richard Wejnarth
Attorneys Patented Sept. 19, 1933

1,927,763

UNITED STATES PATENT OFFICE 1,927,763

PROCESS FOR THE ELECTROTHERMAL TREATMENT OF MATERIALS CONTAINING VOLATILE METALS OR METAL OXIDES

Axel Richard Wejnarth, Eskilstuna, Sweden

Application June 1, 1932, Serial No. 614,793, and in Germany July 10, 1931

3 Claims. (Cl. 75—22.5)

The known processes for the electrothermal treatment of materials containing more or less easily volatile metals and metal oxides have the great disadvantage, that on account of the unequal and fluctuating conversion of the electrical energy into heat the production, the distribution and the maintenance of the temperature throughout the different parts of the charge is uneven and not uniform.

The more or less volatile oxides f. i. PbO, ZnO, CdO, SnO and $SnO_2$ are of course mostly volatilized in those places, where a superheating takes place. Such local superheating happens as well in those furnaces with direct conversion of the electrical energy into heat by means of electrodes which reach into the molten slag or in the charge overlying the same, as also in those furnaces, where indirect heating is applied and the heat produced from the electrical energy is transferred from the walls into the material, which is introduced in the reaction-chamber.

Further in processes of this kind a reoxidation of the metallic vapors and of the volatilized metals, which leave the furnace, takes place by the formed carbonic acid, as soon as the hot vapors are mixed with cooler gases, present in the atmosphere of the furnace.

The reformation of the reduced metals into their oxides and the volatilization of the oxides is especially disagreeable in the electrothermal production of zinc, because the troublesome "zinc dust" is produced thereby.

The object of the present invention is to obviate all these disadvantages, which are derived from the volatilization of the metal oxides and from the reoxidation of the already reduced metallic vapors.

The object is obtained by admixing to the vapors and gases, which are produced in the furnace reducing materials in a state of a very fine division, f. i. in the shape of a dust or powder, whereby care is taken, that the gases and vapors which are loaded with such reducing agents pass into the discharge conduits and from there f. i. into the condensator in a free and unrestricted manner; at the same time the stream of vapors and gases is heated up to the reduction temperature by means of one or several additional sources of heat.

The introduction of the finely divided reducing materials, coal dust, etc., which are carried along with the stream of the vapors and gases, flowing out of the furnace, takes place in a foremost way in that zone of the furnace atmosphere or in that part of the discharge conduit, where the additional heating is carried on.

The additional heating appliances may be arranged before the exit of the gases and vapors from the reaction chamber or they may be inserted in the connecting channel between the reaction chamber and the condensator as a direct and/or indirect source of heat.

They should be advantageously regulated in such a way, that the temperature of the gases or vapors entering the condensator remains practically constant.

It has been already tried to obviate the reoxidation of the metallic vapors or to reduce the metal oxides formed within the outflowing gases by inserting a filter of glowing coal in the conduit, which leads from the furnace.

This proposition could not lead to a satisfactory result, because the filter puts a resistance in the stream of the outflowing gases, so that an overpressure has to be maintained in the furnace and further on account of the fact, that the reaction capacity of the glowing coal-pieces is greatly reduced by the products, which are separated from the outflowing gases and deposited on the coal.

The invention has the advantage that the gases pass free and unrestricted out of the furnace and that the process can be accommodated in a most simple manner to the varying conditions of the work.

The additional sources of heat in the furnace or in the discharge conduit make it possible, that by regulating the temperature of the outflowing gases and the controlled introduction of the reducing powders those conditions are in a most simple manner maintained, which totally prevents the reoxidation of the metallic vapors.

According to the invention one is in the position to control the whole process from the reaction in the furnace up to condensation in such an effective manner, that the formation of metal-oxides is reduced to a minimum.

By means of the additional sources of heat the temperature of the gas mixture entering the condensator is regulated in such a way, that it remains practically constant.

In case zinc is being manufactured the temperature of the gases entering the condensator is kept according to the varying conditions of the work at 920–1200° C.

A furnace for carrying through the present process is by way of example and schematically illustrated in the annexed drawing.

A represents the upper electrode, B the fixed bottom electrode. Instead of a single electrode a plurality of the same may of course be provided. The charge is introduced in the usual way around and between the electrodes.

The reduction of the charge may be also carried on in the furnace by means of indirect electrical heating.

The additional sources of heat may be arranged in various ways. There may be provided one or more electrodes 1 near the surface of the slag and projecting into the same.

One or more free burning arcs 3 may be arranged at the place of exit of the gases from the furnace or electrodes 4 may be located in the channel leading to the condensator.

Finally one or more direct or indirect heating elements 6 may be arranged. In using the exhaust gases of the furnace as an indirect source of heat these gases may be burnt in a circular space 5 surrounding the conduit, which leads from the furnace to the condensator.

What I claim is:

1. A process for the electrothermal production of volatile metals from materials containing the same in oxidic form, consisting in adding to the gases and vapors produced by the process and leaving the furnace in an unrestricted manner reducing materials in the shape of an easily transportable powder for the purpose to reduce reoxidized metals, heating at the same time the gases and vapors to about reduction temperature of the oxides and recovering from these gases the reduced metals by condensation or in any other suitable manner.

2. A process for the electrothermal production of volatile metals from materials containing the same in oxidic form, consisting in adding to the gases and vapors produced by the electrothermal reaction and leaving the furnace in an unrestricted manner within the range of an additional heating zone reducing materials in the shape of a powder for the purpose to reduce reoxidized metals and recovering the reduced metals from these gases in any appropriate manner.

3. A process for the electrothermal production of volatile metals from materials containing the same in oxidic form consisting in adding to the stream of gases and vapors produced by the electrothermal reaction and leaving the furnace in an unrestricted manner reducing materials in the shape of an easily transportable powder for the purpose to reduce reoxidized metals, heating at the same time these gases and vapors to about the reduction temperature of the metal-oxides maintaining by regulation of the temperature of the sources of heat the temperature of the gases entering the condenser practically constant and recovering from the gases the metals by condensation or in any other suitable manner.

4. A process for the electrothermal production of volatile metals from materials containing the same in oxidic form consisting in adding to the gases and vapors produced by the electrothermal reaction and leaving the furnace in an unrestricted manner reducing materials in the shape of powdered coal for the purpose to reduce reoxidized metals, heating at the same time the gases and vapors before their exit from the furnace to about reduction temperature of the metal-oxides and recovering from these gases the metals by condensation or in any other suitable manner.

5. A process for the electrothermal production of volatile metals from materials containing the same in oxidic form consisting in adding to the gases and vapors produced by the process and leaving the reaction room in an unrestricted manner reducing materials in the shape of an easily transportable powder for the purpose to reduce reoxidized metals, heating at the same time the gases and vapors during their passage through the conduit connecting the furnace and the condenser to about reduction temperature of the metal oxides and recovering from these gases the metals by condensation or in any other suitable manner.

6. A process for the electrothermal production of volatile metals from materials containing the same in oxidic form consisting in adding to the gases and vapors produced by the process and leaving the furnace in an unrestricted manner reducing materials in the shape of a powder for the purpose to reduce reoxidized metals directly, heating at the same time the gases and vapors to about reduction temperature of the metal oxides and recovering from these gases the metals by condensation or in any other suitable manner.

7. A process for the electrothermal production of volatile metals from materials containing the same consisting in adding to the gases and vapors produced by the process and leaving the furnace in an unrestricted manner reducing materials in the shape of a powder for the purpose to reduce reoxidized metals, indirectly heating at the same time the gases and vapors to about reduction temperature of the metal oxides and recovering from these gases the metals by condensation or in any other suitable manner.

8. A process for the electrothermal production of volatile metals from materials containing the same consisting in adding to the gases and vapors produced by the process and leaving the furnace in an unrestricted manner reducing materials in the shape of a powder for the purpose to reduce reoxidized metals, directly and indirectly, heating at the same time the gases and vapors to about reduction temperature of the metal oxides and recovering from these gases the metals by condensation or in any other suitable manner.

AXEL RICHARD WEJNARTH.